United States Patent
Keller et al.

(10) Patent No.: US 10,658,829 B2
(45) Date of Patent: May 19, 2020

(54) EXCITATION SYSTEM

(71) Applicant: ABB Schweiz AG, Baden (CH)

(72) Inventors: Tobias Keller, Gebenstorf (CH); Wolfgang Knapp, Lenzburg (CH)

(73) Assignee: ABB Schweiz AG, Baden (CH)

( * ) Notice: Subject to any disclaimer, the term of this patent is extended or adjusted under 35 U.S.C. 154(b) by 316 days.

(21) Appl. No.: 15/706,941

(22) Filed: Sep. 18, 2017

(65) Prior Publication Data

US 2018/0026434 A1 Jan. 25, 2018

Related U.S. Application Data

(63) Continuation of application No. PCT/EP2016/055815, filed on Mar. 17, 2016.

(30) Foreign Application Priority Data

Mar. 17, 2015 (EP) .................................. 15159442

(51) Int. Cl.
- *H02H 3/00* (2006.01)
- *H02H 1/00* (2006.01)
- *H02M 1/32* (2007.01)
- *H02P 9/10* (2006.01)
- *H02M 7/12* (2006.01)

(Continued)

(52) U.S. Cl.
CPC ............ *H02H 1/0015* (2013.01); *H02M 1/32* (2013.01); *H02M 7/00* (2013.01); *H02M 7/12* (2013.01); *H02M 7/145* (2013.01); *H02P 9/10* (2013.01); *H02H 3/023* (2013.01); *H02H 7/065* (2013.01)

(58) Field of Classification Search
None
See application file for complete search history.

(56) References Cited

U.S. PATENT DOCUMENTS

| 4,233,554 A | * | 11/1980 | Ellis | H01M 2/34 200/82 R |
| 6,426,632 B1 | | 7/2002 | Clunn | |

(Continued)

FOREIGN PATENT DOCUMENTS

| CN | 2049842 A | 2/1989 |
| CN | 101621204 B | 1/2010 |

(Continued)

OTHER PUBLICATIONS

European Search Report, EP15159442, ABB Technology AG, dated Sep. 21, 2015, 6 pages.

(Continued)

*Primary Examiner* — Stephen W Jackson
(74) *Attorney, Agent, or Firm* — Taft Stettinius & Hollister LP; J. Bruce Schelkopf

(57) ABSTRACT

A excitation system and a generator arrangement with the excitation system is proposed. The excitation system comprises a converter adapted for converting an AC current to a DC current, a switching device for short circuiting an AC input of the converter, and an arc detection device for detecting an arc fault in the excitation system and for actuating the switching device upon detecting the arc fault. Therein, the switching device comprises an irreversible switch adapted for short circuiting the AC input such that the arc fault is quenched. This provide a comprehensive protection against arc faults.

17 Claims, 1 Drawing Sheet

(51) Int. Cl.
*H02M 7/00* (2006.01)
*H02M 7/145* (2006.01)
*H02H 3/02* (2006.01)
*H02H 7/06* (2006.01)

(56) References Cited

U.S. PATENT DOCUMENTS

| | | | |
|---|---|---|---|
| 7,145,757 B2 * | 12/2006 | Shea | H02H 1/0023 |
| | | | 361/2 |
| 2009/0278354 A1 | 11/2009 | Ichinose et al. | |
| 2010/0220507 A1 | 9/2010 | Schroeder et al. | |
| 2010/0321838 A1 | 12/2010 | Wu et al. | |

FOREIGN PATENT DOCUMENTS

| | | | |
|---|---|---|---|
| CN | 102066748 A | 5/2011 |
| CN | 102611365 A | 7/2012 |
| CN | 104823375 A | 8/2015 |
| DE | 4438592 A1 | 5/1996 |
| DE | 10254497 B3 | 6/2004 |
| EP | 1758222 A2 | 2/2007 |
| EP | 1976077 A2 | 10/2008 |
| EP | 2270944 A2 | 1/2011 |
| EP | 2538511 A1 | 12/2012 |
| FR | 2983003 A1 | 5/2013 |
| WO | 0195452 A1 | 12/2001 |

OTHER PUBLICATIONS

International Search Report, PCT/EP2016/055815, ABB Technology AG, dated May 19, 2016, 4 pages.
International Preliminary Report on Patentability, PCT/EP2016/055815, ABB Schweiz AG, dated Jun. 21, 2017.
The metal oxide resistor—at the hear of modern surge arresters, ABB Review 1/89 (8 pages).
T. Frankie, et al., "A new 80kV/14kA Solid State Thyristor Crowbar for the Commissioning and Testing of Vacuum Power Tubes in Fusion Research at IPP Garching", Jan. 1, 2012 (16 pages).

* cited by examiner

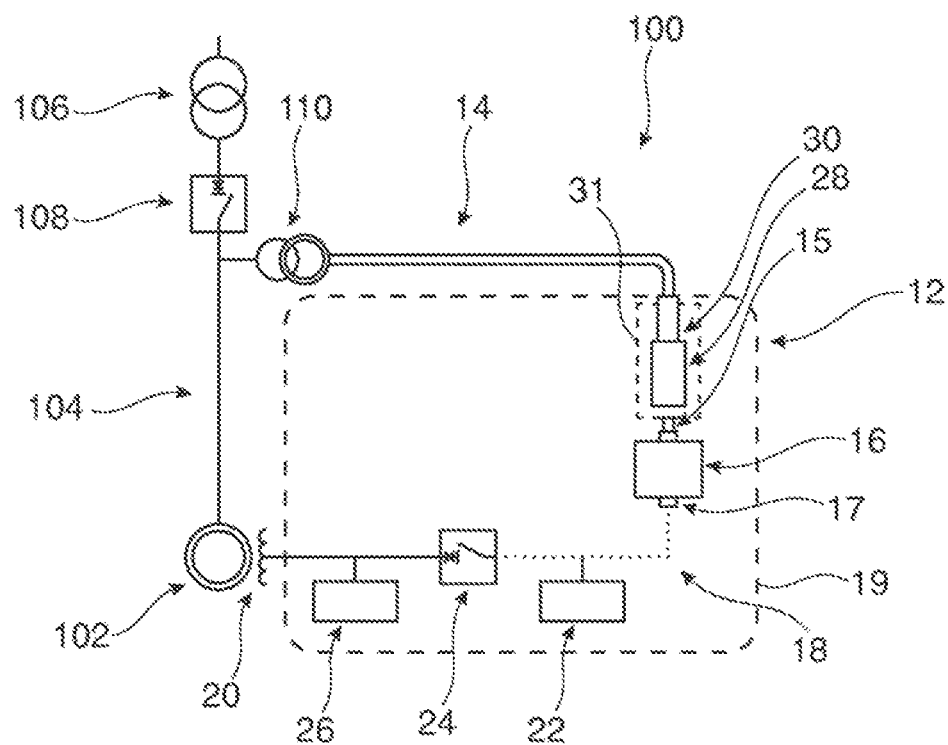
Fig. 1a
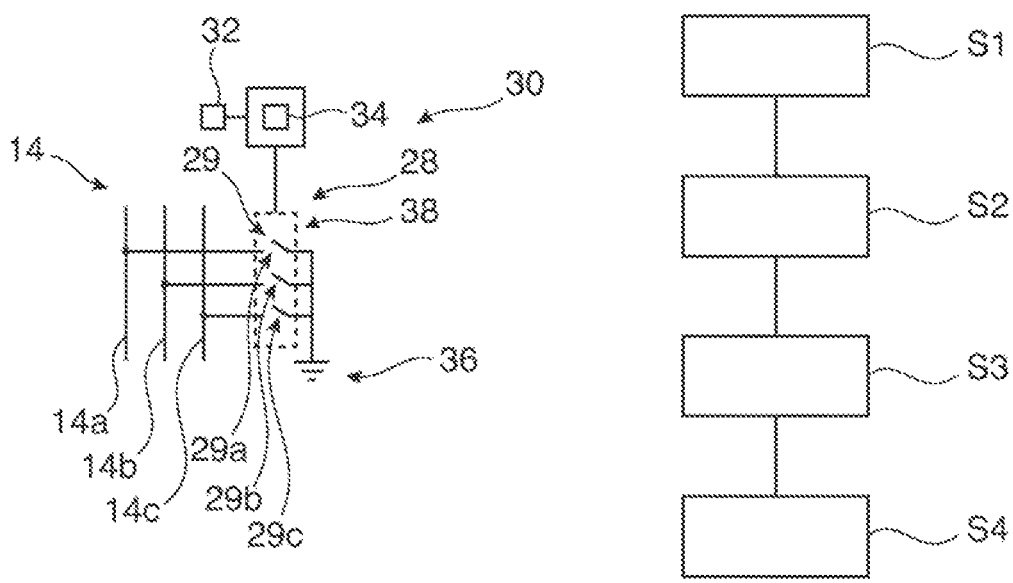
Fig. 1b
Fig. 2

EXCITATION SYSTEM

FIELD OF THE INVENTION

The invention relates to a excitation system, a generator arrangement and a method for quenching arc faults.

BACKGROUND OF THE INVENTION

Electrical power supply systems, such as e.g. DC power supply systems used in excitation systems for generators, which are used for exiting the generator, may be based on a converter for converting an AC current to a DC current. The DC current may then be supplied to a main system, such as e.g. to a generator.

As result of a malfunction and/or a short circuit in a component of the main system and/or in the power supply system, arc faults may occur, which may potentially damage components or parts of the power supply system and/or the main system.

To avoid arc faults and/or to prevent arc faults from fully establishing, current limiting systems may be employed, which current limiting systems may be adapted for limiting excessive transient currents e.g. in a supply line of the power supply system. However, such current limiting systems may be rather cost-intensive.

DESCRIPTION OF THE INVENTION

It is an object of the present invention to provide a cost effective and compact excitation system with reliable and comprehensive safety functions, particularly a comprehensive protection against arc faults.

This objective is achieved by the subject-matter of the independent claims. Further exemplary embodiments are evident from the dependent claims and the following description.

An aspect of the present invention relates to a excitation system. The excitation system is used for exiting a generator.

According to an embodiment of the invention, the excitation system comprises a converter adapted for converting an AC current to a DC current, a switching device for short circuiting an AC input of the converter, and an arc detection device for detecting an arc fault in the excitation system and for actuating the switching device upon detecting the arc fault. Therein, the switching device comprises an irreversible switch adapted for short circuiting the AC input of the converter such that the arc fault is quenched and/or extinguished and/or de-excited.

The term irreversible switch may refer to a switch, which may be actuated by destroying and/or damaging at least a part of the switching device, in particular by intentionally destroying and/or damaging. The "irreversible" refers to the function of switching from an open position of the switch to a closed position of the switch. After the irreversible switching, the irreversible switch stays in its closed position. Accordingly, the irreversible switch may denote a single-use switch, which may be at least partly replace after usage.

The AC input of the converter may refer to an input terminal and/or an electrical input line, such as e.g. a wire, a cable, or a busbar adapted for supplying an alternating current to the converter.

By quenching the arc fault immediately after its detection, the arc fault may be prevented from fully developing and potential damage to components of the excitation system and/or to further electrical equipment connected to the excitation system may be reduced and/or avoided. In turn this may safe cost since e.g. a replacement of components may be avoided, maintenance costs may be reduced and/or idle periods of the further electrical equipment and/or the excitation system may be reduced. Further, also a health risk for personnel may be reduced and/or minimized.

Accordingly, the inventive excitation system may e.g. protect staff working in a vicinity of the excitation system. Further, it may protect assests, especially in closed and/or delicate locations like caverns, marine vessels, wind towers, a central city, and the like.

A further aspect of the invention relates to a generator arrangement comprising at least one excitation system as described in the above and in the following.

Yet a further aspect of the invention relates to a method for quenching and/or extinguishing and/or de-exciting an arc fault.

It has to be understood that features of the method as described in the above and in the following may be features of the excitation system and/or the generator arrangement as described in the above and in the following. Vice versa, features of the excitation system and/or the generator arrangement as described in the above and in the following may be features of the method.

According to an embodiment of the invention, the switching device comprises a propellant adapted for actuating the irreversible switch. In other words, the irreversible switch may be actuateable by a propellant and/or it may be pyrotechnically actuateable. The propellant may denote e.g. an explosive charge, a propelling charge, an expanding agent, and/or any other appropriate agent, means, substance, compound, or material, which may be rapidly expanding upon actuation and/or upon activation such that the irreversible switch may be rapidly actuated and the arc fault may be rapidly quenched and/or extinguished.

According to an embodiment of the invention, the irreversible switch of the switching device is actuateable within an actuation time below 10 ms. For example the actuation time may be below 6 ms and preferably the actuation time may be below 4 ms. The actuation time may refer to a time interval between a detection time, in which the arc fault may be detected, and a quench time, in which the arc fault may be quenched and/or extinguished by actuation of the irreversible switch. Quenching and/or extinguishing the arc fault within the actuation time may advantageously prevent the arc fault from fully developing and/or it may prevent damage to the excitation system and/or further electrical equipment connected to it.

According to an embodiment of the invention, the switching device comprises at least one thyristor adapted for providing a conduction path, when actuated by the arc detection device. The conduction path may be provided for example from the AC input of the converter to ground and/or between various phases of the AC input. The conduction path may be provided e.g. by melting and/or destroying at least a part of the thyristor, thereby forming an alloy. The thyristor may be replaced after a short-circuit. In this context, the thyristor may refer to the irreversible switch. However, it may also be conceivable to reversibly actuate the thyristor in order to provide the conduction path. For handling an AC current and/or an AC voltage, two thyristors may be arranged in series in the AC input, wherein one thyristor may be reversed with respect to the other thyristor. In other words the two thyristors may be arranged in a back-to-back arrangement in the AC input.

According to an embodiment of the invention, the irreversible switch of the switching device is further adapted for grounding and/or earthing the AC input of the converter, when actuated by the arc detection device. In other words, the irreversible switch may be adapted for establishing an electrical connection between the AC input and a conductive element, such as e.g. a cable or wire, being on ground potential. This way electrical energy and/or an AC current carried by the AC input may be purged and the arc fault may be quenched and/or extinguished by withdrawing and/or purging the electrical energy and/or the respective AC current.

According to an embodiment of the invention, the arc detection device comprises an electro-magnetic sensor device adapted for detecting electro-magnetic radiation emitted by the arc fault.

According to an embodiment of the invention, the arc detection device comprises an optical sensor device adapted for detecting light emitted by the arc fault. The arc fault, once it has developed, may generate a plasma emitting electro-magnetic radiation ranging from ultraviolet to infrared radiation, which electro-magnetic radiation may be a reliable indicator for a presence of the arc fault and thus may serve for reliably detecting the arc fault.

According to an embodiment of the invention, the arc detection device comprises a pressure sensor device adapted for detecting an air pressure increase in a housing of the excitation system caused by the arc fault. The housing may e.g. denote a cabinet and/or a container accommodating the excitation system. The arc fault and the corresponding generation of plasma may be accompanied by a temperature increase of surrounding air and/or an evaporation of ions, atoms, molecules, and/or matter. This in turn may lead to the air pressure increase in the housing, which may then serve as a reliable indicator for the presence of the arc fault.

According to an embodiment of the invention, the arc detection device comprises a controller adapted for electronically detecting the arc fault by an increase of an AC current at the AC input. The controller and/or the excitation system may comprise appropriate measurement means for monitoring and/or measuring the AC current at the AC input. A certain threshold AC current, which threshold current may also depend on a voltage at the AC input, may be a reliable indicator for the presence of the arc fault and the controller may trigger the irreversible switch in response to detecting an AC current equal to or above the threshold current.

According to an embodiment of the invention, the arc detection device and the irreversible switch are accommodated in one housing of the switching device. In other words, the arc detection device may be part of the switching device. This may allow to provide a compact excitation system with comprehensive safety functions. Further, already existing systems may be easily, quickly and cost effective retrofit and/or equipped with the switching device and/or the arc detection device in order to increase a reliability and/or a safety of the existing system.

According to an embodiment of the invention, the switching device is galvanically connected to the converter. In other words there might be no transformer arranged between the switching device and converter and/or the switching device may be directly connected, e.g. via a conductive element, to the converter in order to comprehensively protect the converter against arc faults.

According to an embodiment of the invention, the AC input comprises three phases and the irreversible switch is adapted for short circuiting the three phases with each other. In other words, the AC current supplied via the AC input to the converter may refer to a three-phase alternating current and/or a rotating current, and the irreversible switch may be adapted for interconnecting all phases of the AC current with each other in order to prevent an arc fault at least from fully developing.

A further aspect of the invention relates to a generator arrangement comprising a generator with an AC output line and a excitation system for exiting a generator as described in the above and in the following. Therein, the AC input of the converter of the excitation system is coupled to the AC output line of the generator. This way, at least a part of an AC current generated by the generator and purged via the AC output line may be used as AC input current for the excitation system. The AC input current may be converted to a DC current by the converter, which DC current may be supplied e.g. to rotor winding of the generator in order to magnetize a rotor of the generator.

According to an embodiment of the invention, a transformer is connected between the switching device and the AC output line of the generator. In other words, the excitation system and/or its AC input may be coupled via a transformer to the AC output line of the generator.

According to an embodiment of the invention, the generator arrangement further comprises a line switch provided in the AC output line, wherein the AC input of the converter is connected to the AC output line between the generator and the line switch. The line switch may denote a circuit breaker for entirely disconnecting the generator and/or its AC output line e.g. from a supply grid or network, to which the generator may feed electrical energy.

According to an embodiment of the invention, the generator arrangement further comprises a further transformer connected to the AC output line, wherein the line switch is adapted for disconnecting the further transformer from the generator. The generator may for instance be connected to a supply grid or network via the line switch and the further transformer.

A further aspect of the invention relates to a method for quenching and/or extinguishing and/or de-exciting arc faults. The method comprises converting an AC current to a DC current with a excitation system, detecting an arc fault in the excitation system, actuating a switching device connected to an AC input of a converter of the excitation system upon detecting the arc fault, and short circuiting the AC input with an irreversible switch of the switching device such that the arc fault is quenched and/or extinguished and/or de-excited.

If technically possible but not explicitly mentioned, also combinations of embodiments of the invention described in the above and in the following may be embodiments of the method, the excitation system and the generator arrangement.

These and other aspects of the invention will be apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings.

FIG. 1a shows a generator arrangement with a excitation system according to an embodiment of the invention.

FIG. 1b shows a detailed view of a part of the excitation system of FIG. 1a.

FIG. 2 shows a flow chart illustrating steps of a method for quenching are faults according to an embodiment of the invention.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

FIG. 1a shows a generator arrangement 100 with a excitation system 12 according to an embodiment of the invention. FIG. 1b shows a detailed view of a part of the excitation system 12 of FIG. 1a, wherein a switching device 28 and an arc detection device of the excitation system 12 of FIG. 1a are shown in FIG. 1b.

The generator arrangement 100 comprises a generator 102 adapted for converting kinetic energy and/or rotational energy of a rotor of the generator 102 to electrical energy. The generator 102 shown in FIG. 1a is designed as a synchronous generator and/or a synchronous machine. The generator 102 may be adapted for generating a rotating AC current and/or a multiphase alternating current, such as e.g. a three-phase alternating current.

The AC current generated by the generator 102 is purged and/or tapped via an AC output line 104, and it may be supplied e.g. to an electrical supply grid and/or an electrical supply network. For this purpose, a transformer 106 is arranged at the AC output line 104, which transformer 106 is adapted for transforming the AC current and/or an alternating voltage generated by the generator 102.

The generator arrangement 100 further comprises a line switch 108 arranged between the transformer 106 and the generator 102 in the AC output line 104, wherein the line switch 108 is adapted for disconnecting the transformer 106 from the generator 102 and/or for disconnecting the generator 102 from the supply grid. The line switch 108 may for example comprise a circuit breaker.

Between the generator 102 and the line switch 108 another transformer 110 is connected to the AC output line 104, which transformer 110 is adapted for supplying at least a part of the electrical energy generated by the generator 102 to the excitation system 12. The AC output line 104 is coupled via the transformer 110 to an AC input 14 of the excitation system 12.

The AC input 14 of the excitation system 12 is connected to an AC input terminal 15 of a converter 16 of the excitation system 12. The excitation system 12 further comprises a DC output 18 connected to a DC output terminal 17 of the converter 16. The converter 16 is adapted for converting an AC current, supplied via the AC input 14 to the converter 16, to a DC current supplied to the DC output 18. The converter 16 may for this purpose comprise a rectifier and/or an inverter. In order to process and/or convert comparably high voltages and/or currents, the converter 16 may further comprise and/or be based on at least one diode and/or a thyristor. The converter may for instance comprise an IGBT, a GTO, and/or an IGCT.

The AC input 14 and/or the DC output 18 of the excitation system 12 may comprise a wire, a cable, a busbar, and/or any other current carrying element connected to the AC input terminal 15 and/or the DC output terminal 17, respectively. Moreover, the AC input terminal 15 may be part of the AC input 14 and/or the DC output terminal 17 may be part of the DC output 18.

Further, as consequence of the AC current generated by the generator 102 and transformed via transformer 110, the AC current supplied via the AC input 14 to the converter 16 may also be a multiphase alternating current, such as e.g. a three-phase alternating current and/or a rotating current. Correspondingly, the AC input 14 may comprise an AC input line for each phase, which AC input lines may be isolated against each other. 14b, 14c of the AC input 14. However, also a single phase alternating current may be supplied via the AC input 14 to the converter 16.

Further, the converter 16 may be a multiphase converter adapted for converting the multiphase alternating current to a DC current. The converter 16 may for instance comprise a converter section for each phase, wherein the converter sections may connected in parallel. Accordingly, in case of a three-phase AC current, the converter 16 may comprise three converter sections connected in parallel.

The excitation system 12 shown in FIG. 1a may be arranged in a housing 19, such as e.g. a container, a cabinet and/or a section of a cabinet. Further, the excitation system 12 may be regarded as high-power rectifier system. The excitation system for the generator 102 is adapted for magnetizing a rotor of the generator 102 by tapping, by means of the transformer 110, at least a part of the AC current generated by the generator 102, converting the tapped AC current to a DC current by means of the converter 16, and supplying the converted DC current via the DC output 18 e.g. in the frame of a static excitation to at least one rotor winding of the generator 102 and/or in the frame of an indirect and/or brushless excitation to a stator of an exciter machine (not shown in FIG. 1a) of generator 102. In this context, transformer 110 may refer to an excitation transformer. For finally exciting the generator 102, the excitation system 12 and/or the generator arrangement 100 comprises a coupling means 20. For indirect and/or brushless excitation the coupling means 20 may comprise the exciter machine and at least one diode. For static excitation the coupling means 20 may comprise sliding rings and/or brushes in sliding contact with at least a part of the generator's 102 rotor.

In a further embodiment of the invention, the excitation system 12 might have more than one converter 16 adapted for converting the AC current to a DC current. The converters can be connected in parallel on their DC side. In the simplest embodiment two converters are used but also more than two might be used. In the case of two converters, the transformer 110 might have on its secondary side a first three-phase winding in delta connection to which an AC input of the first converter is connected, and a second three-phase winding in star connection to which an AC input of the second converter is connected.

Due to the delta connection and the star connection of the two three phase winding systems, the two three-phase systems are phase shifted to each other by 60 degrees, which is well known to the person skilled in the art. It has to be understood that also more than two winding systems might be provided by the transformer on its secondary side, each winding system being connected to a respective AC input of a respective converter. The converters might be connected in parallel on their DC side.

The AC inputs of the converters might be equipped with a respective switching device 28 for short circuiting the respective AC input of the respective converter as described with respect to the other embodiments. Further, a respective arc detection device is used for each AC input.

The excitation system 12 as shown in FIG. 1a further comprises a field flashing device 22 adapted for providing and/or generating and/or exciting a certain minimum magnetization to the generator's 102 rotor by means of supplying a certain DC current to the generator 102 and/or a rotor winding, in case the rotor has not been magnetized and/or used before. Once the rotor has been magnetized the first time by means of the field flashing device 22, a further application of the field flashing device 22 may not be required due to a certain magnetic remanence and/or a residual magnetism in the rotor.

In order to disconnect the excitation system 12 and/or the DC output 18 of the excitation system 12 from the generator 102, the excitation system 12 further comprises a DC line switch 24 arranged in the DC output 18. The DC line switch 24 may be arranged between the coupling means 20 and the field flashing device 22, and it may be designed as circuit breaker.

In case the generator 102 is running and/or the generator's 102 rotor is magnetized and rotating and the line switch 108 is actuated to an open state and/or opened such that the generator 102 is disconnected from the supply grid, a rather huge amount of rotational and/or kinetic energy stored in the rotating rotor may be converted to electrical energy as long as the rotating rotor is still magnetized. This electrical energy may then circulate, e.g. for several seconds, from the AC output line 104 via transformer 110 to the AC input 14 of the excitation system 12 and via the converter 16 and the DC output 18 of the excitation system 12 back to the generator 102, thereby at least partly maintaining or even increasing the magnetization of the generator's 102 rotor. Accordingly, in such a shut-down case, i.e. when line switch 108 is open and/or actuated to an open state, it may be required to dissipate the circulating electrical energy and/or to de-magnetize the generator's 102 rotor. This may be required although a transformer core of transformer 110 may limit the amount of electrical energy transferred from AC output line 104 to the AC input 14.

In order to de-magnetize the rotor of generator 102 and in order to prevent further rotational and/or kinetic energy of the rotor from being converted to electrical energy, the excitation system 12 further comprises a field suppression device 26 arranged at the DC output 18 between coupling means 20 and DC line switch 24. The field-suppression device 26 may for instance comprise a resistance adapted for dissipating DC current supplied via the DC output 18 to the generator 102 and in turn for de-magnetizing the rotor.

Furthermore, when line switch 108 is actuated to an open state and/or opened and/or in case of a malfunction of a component of the generator arrangement 100 and/or the excitation system 12, an arc fault may develop and potentially damage a component of the generator arrangement 100 and/or the excitation system 12. Such malfunction may for instance be a short-circuit in the AC output line 104. In case of such short circuit, a short circuit current may be at least partly conducted via transformer 110 to the exictation system 12, wherein a secondary winding of transformer 110 and/or the AC input 14 of excitation system 12 may be required to withstand the short-circuit until the rotor of generator 102 may be de-magnitized, e.g. by means of field suppression device 26.

Generally, an arc fault occurring and/or developing at the AC input 14 may inflict rather large damage to the excitation system 12 at least on the AC input 14 and/or the converter 16. In case the arc fault occurs at and/or inside converter 16 and/or at the DC output 18, fuses of excitation system 12 may blow and/or a plasma generated by the arc fault may spread to the AC input 14, thereby also inflicting rather large damage. In contrast, if the arc fault arises at the DC output 18, potential damage may be limited e.g. by thyristors of the converter 16 and/or by fuses of the excitation system 12 and/or of the converter 16.

Apart from potentially damaging a component of the generator arrangement 100 and/or the excitation system 12, an arc fault may endanger personnel in the vicinity of excitation system 12, in particular if the excitation system 12 is arranged in a closed housing 19, such as e.g. in a closed cabinet.

In order to quickly extinguish and/or quench and/or de-excite an arc fault occurring in the excitation system 12 and/or in order to prevent an arc fault from fully developing, the excitation system 12 further comprises a switching device 28 with an irreversible switch 29 for short-circuiting the AC input 14 of converter 16 and an arc detection device 30 for detecting an arc fault in the excitation system 12. The switching device 28 and the arc detection device are shown in detail in FIG. 1b. The arc detection device 30 is adapted for actuating and/or triggering the switching device 28 and/or for actuating and/or triggering the irreversible switch 29 upon detecting the arc fault. The irreversible switch 29 and the arc detection device 30 may be arranged in a common housing 31 of the switching device 28 or the arc detection device 30 may be a separate component of the excitation system 12. Further, the switching device 28 and/or the arc detection device may be arranged at an entrance of the housing 19 of excitation system 12.

The arc detection device 30 comprises a detection means 32 for detecting the arc fault. The detection means may for instance comprise an electro-magnetic sensor device adapted for detecting electro-magnetic radiation emitted by the arc fault. Alternatively or additionally the detection means 32 may comprise an optical sensor device adapted for detecting visible and/or non-visible light emitted by the arc fault. Upon detecting, by means of the detection means 32, a certain threshold in an intensity of the electro-magnetic radiation and/or the light emitted by the arc fault, the arc detection device 30 may actuate and/or trigger the irreversible switch 29 of the switching device 28. The arc detection device 30 may comprise a controller 34, which controller 34 may be adapted for sending a trigger signal to the switching device 29 in order to actuate and/or trigger the irreversible switch 29 upon detecting the arc fault by means of the detection means 32.

Alternatively or additionally the detection means 32 may comprise a pressure sensor device adapted for detecting an air pressure increase in the housing 19 of excitation system 12 caused by the arc fault. Upon detecting, by means of the detection means 32, a certain threshold in air pressure caused by the arc fault, the arc detection device 30 may actuate and/or trigger the irreversible switch 29 of the switching device 28, e.g. by the controller 34 of arc detection device 30, which controller 34 may send a trigger signal upon detecting the arc fault by means of the detection means 32.

Moreover, alternatively or additionally the controller 34 of the arc detection device 30 may be adapted for electronically detecting the arc fault by an increase of an AC current at the AC input 14 with respect to time, e.g. further optionally taking into account a voltage at the AC input 14. For this purpose, the arc detection device 30 may further comprise a current sensor device for measuring and/or monitoring the AC current at the AC input 14 and/or a voltage sensor device for measuring and/or monitoring the voltage at the AC input 14. Upon detecting, by means of the detection means 32, a certain threshold of the AC current at the AC input 14, the controller 34 may actuate and/or trigger the irreversible switch 29 of the switching device 28 by sending a trigger signal to the switching device 28.

Once the arc fault is detected by means of the detection means 32 of arc detection device 30, the controller 34 of the arc detection device 30 actuates and/or triggers the irreversible switch 29, e.g. by supplying the trigger signal to the switching device 28. By actuating and/or triggering the irreversible switch 29, the switching device 28 and/or the irreversible switch 29 short-circuits the AC input 14 such that the arc fault is quenched and/or extinguished and/or de-excited. Therein, the switching device 28 and/or the irreversible switch 29 grounds and/or earths the AC input 14, for instance by connecting the AC input 14 to a conductive element 36 being on ground potential, such that the AC current feeding and/or energizing the arc fault may be purged from the AC input 14 to the conductive element, thereby quenching the arc fault. Moreover, in case the AC current at AC input 14 is a multiphase current, the irreversible switch 29 may further short-circuit and/or interconnect all phases 14a, 14b, 14c of the multiphase current at the AC input 14. For the case of a three-phase AC current an interconnection of the three phases 14a, 14b, 14c as well as grounding the entire AC input 14 by the irreversible switch 29 in response to a detected arc fault, FIG. 1b exemplary and symbolically shows three switch sections 29a, 29b, 29c of the irreversible switch 29. However, the switch sections 29a, 29b, 29c may only be regarded illustrative.

However, common switches may not be suited for quickly quenching an arc fault, as these switches may exhibit comparatively long switching times and/or actuation times, which may be e.g. in the range of several tens of milliseconds. Therefore, the switching device 28 comprises a propellant 38 for quickly actuating the irreversible switch 29 within an actuation time and/or a switching time below 10 ms, and preferably below 4 ms.

By way of example, the irreversible switch 29 may be actuated by triggering and/or firing the propellant 38, e.g. in response to a trigger signal received from the arc detection device 30 and/or controller 34. The propellant 38 may expand and drive, shoot and/or accelerate e.g. a conductive bolt towards the conductive element 36 being on ground potential, such that an electrical connection may be established between the AC input 14 and the conductive element. As a consequence, the arc fault may be extinguished within the actuation time of the irreversible switch 29 of below 10 ms, preferably below 4 ms.

Once the switching device 28 and/or the irreversible switch 29 was actuated, the switching device and/or the irreversible switch 29 and/or the arc detection device 30 may be at least partly replaced.

In order to reduce a risk of unintentional actuation of the switching device 28 and/or the irreversible switch 29, for instance due to a flash-light, a lightning, an electro-magnetic interference, and/or the like detected by the arc detection device 30, the irreversible switch 29 may be inhibited and/or deactivated, e.g. by means of a trigger inhibiting device. This may allow to enable an arc fault protection in the excitation system 12 by activating the irreversible switch 29 and/or the switching device 28 if required, e.g. when personnel is inside the housing 19 of excitation system 12, while allowing to deactivate the irreversible switch 29 and/or the switching device 28 if no arc protection is required.

FIG. 2 shows a flow chart illustrating steps of a method for quenching and/or extinguishing and/or de-exciting arc faults according to an embodiment of the invention.

In a first step S1 an AC current is converted to a DC current with the excitation system 12.

In a second step S2 the arc fault is detected in the excitation system 12 by means of the arc detection device 30 as described in the above. In response to detecting the arc fault, the arc detection device 30 may provide a trigger signal to the switching device 28, which trigger signal may be an electronic, an electric, an optical, and/or any other appropriate signal.

In a further step S3 the switching device 28 and/or the irreversible switch 29 is actuated upon detecting the arc fault and/or upon receiving the trigger signal from the arc detection device 30. This may comprise triggering and/or firing the propellant of the switching device 28.

In a step S4 the AC input 14 of excitation system 12 is short-circuited and/or grounded and/or earthed by means of the irreversible switch 29 of the switching device 28 such that the arc fault is quenched and/or extinguished and/or de-excited. This may comprise connecting the AC input 14 to a conductive element being on ground potential, and/or purging the AC current at the AC input 14 to the conductive element. Further, step S4 may comprise short-circuiting all phases of a multiphase AC current at the AC input 14.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 12 excitation system
14 AC input
14a-c AC input lines
15 AC input terminal
16 converter
17 DC output terminal
18 DC output
19 housing
20 coupling means
22 field flashing device
24 DC line switch
26 field suppression device
28 switching device
29a-c switch sections
30 arc detection device
31 housing
32 detection means
34 controller
36 conductive element
38 propellant
100 generator arrangement
102 generator
104 AC output line
108 line switch
110 transformer

The invention claimed is:

1. A excitation system, comprising:
a converter adapted for converting an AC current to a DC current;
a switching device for short circuiting an AC input of the converter, the AC input comprising multiple phases; and
an arc detection device for detecting an arc fault in the excitation system and for actuating the switching device upon detecting the arc fault;
wherein the switching device comprises an irreversible switch adapted for short circuiting the AC input such that the arc fault is quenched, the irreversible switch is actuateable by the arc detection device and which is adapted for short circuiting the multiple phases with each other;
wherein the switching device comprises at least one thyristor adapted for providing a conduction path, when actuated by the arc detection device.

2. The excitation system according to claim 1,
wherein the switching device comprises a propellant adapted for actuating the irreversible switch.

3. The excitation system according to claim 1,
wherein the irreversible switch of the switching device is actuateable within an actuation time below 10 ms.

4. The excitation system according to claim 1,
wherein the irreversible switch of the switching device is further adapted for grounding the AC input of the converter, when actuated by the arc detection device.

5. The excitation system according to claim 1,
wherein the arc detection device comprises an electromagnetic sensor device adapted for detecting electromagnetic radiation emitted by the arc fault; and/or
wherein the arc detection device comprises an optical sensor device adapted for detecting light emitted by the arc fault.

6. The excitation system according to claim 1,
wherein the arc detection device comprises a pressure sensor device adapted for detecting an air pressure increase in a housing of the excitation system caused by the arc fault; and/or
wherein the arc detection device comprises a controller adapted for electronically detecting the arc fault by an increase of an AC current at the AC input.

7. The excitation system according to claim 1,
wherein the arc detection device and the irreversible switch are accommodated in one housing of the switching device; and/or
wherein the switching device is galvanically connected to the converter.

8. The excitation system according claim 1,
wherein the AC input comprises three phases.

9. The excitation system according to claim 1,
wherein the excitation system is designed at least as a part of an excitation system for a generator.

10. A generator arrangement, comprising:
a generator with an AC output line; and
a excitation system, comprising
a converter adapted for converting an AC current to a DC current,
a switching device for short circuiting an AC input of the converter, the AC input comprising multiple phases,
an arc detection device for detecting an arc fault in the excitation system and for actuating the switching device upon detecting the arc fault, and
wherein the switching device comprises an irreversible switch adapted for short circuiting the AC input such that the arc fault is quenched, the irreversible switch is actuateable by the arc detection device and which is adapted for short circuiting the multiple phases with each other;
wherein the AC input of the converter is coupled to the AC output line;
wherein the switching device comprises at least one thyristor adapted for providing a conduction path, when actuated by the arc detection device.

11. The generator arrangement of claim 10, further comprising:
a transformer connected between the switching device and the AC output line of the generator.

12. The generator arrangement of claim 10, further comprising:
a line switch provided in the AC output line,
wherein the AC input of the converter is connected to the AC output line between the generator and the line switch.

13. The generator arrangement of claim 12, further comprising:
a further transformer connected to the AC output line, wherein the line switch is adapted for disconnecting the further transformer from the generator.

14. A method for quenching arc faults in an excitation system comprising a converter adapted for converting an AC current to a DC current, the method comprising:
detecting an arc fault in the excitation system;
actuating a switching device connected to an AC input of a converter of the excitation system upon detecting the arc fault;
short circuiting the AC input with an irreversible switch of the switching device such that the arc fault is quenched;
wherein the irreversible switch is actuated by the arc detection device, such that the irreversible switch short circuits multiple phases of the AC input;
wherein the switching device comprises at least one thyristor adapted for providing a conduction path, when actuated by the arc detection device.

15. The excitation system according to claim 2, wherein the irreversible switch of the switching device is actuateable within an actuation time below 10 ms.

16. The generator arrangement according to claim 10, wherein the switching device comprises a propellant adapted for actuating the irreversible switch.

17. The generator arrangement of claim 11, further comprising:
a line switch provided in the AC output line,
wherein the AC input of the converter is connected to the AC output line between the generator and the line switch.

* * * * *